United States Patent
Nunn et al.

(10) Patent No.: US 7,585,390 B2
(45) Date of Patent: Sep. 8, 2009

(54) COMPOSITE WEB AND PROCESS FOR MANUFACTURE FROM POST-INDUSTRIAL SCRAP

(76) Inventors: Kayren Joy Nunn, 6712 E. 118th St., Bixby, OK (US) 74008; Homan B. Kinsley, 6161 E. River Rd., Bohannon, VA (US) 23021

( * ) Notice: Subject to any disclaimer, the term of this patent is extended or adjusted under 35 U.S.C. 154(b) by 39 days.

(21) Appl. No.: 11/343,238

(22) Filed: Jan. 30, 2006

(65) Prior Publication Data

US 2006/0191655 A1    Aug. 31, 2006

Related U.S. Application Data

(60) Provisional application No. 60/648,143, filed on Jan. 28, 2005.

(51) Int. Cl.
*D21H 11/00* (2006.01)
(52) U.S. Cl. ............... 162/147; 162/146; 162/158; 162/95; 162/98; 264/257
(58) Field of Classification Search ............... 162/147, 162/146, 158, 95, 98; 264/257
See application file for complete search history.

(56) References Cited

U.S. PATENT DOCUMENTS

| | | | |
|---|---|---|---|
| 5,614,570 A * | 3/1997 | Hansen et al. | ............... 524/13 |
| 5,989,296 A | 11/1999 | Patton et al. | |
| 6,120,554 A | 9/2000 | Patton et al. | |
| 6,378,179 B1 | 4/2002 | Hirsch | |
| 6,630,054 B1 * | 10/2003 | Graef et al. | ............... 162/101 |

FOREIGN PATENT DOCUMENTS

| JP | 200460127 A | 2/2004 |
|---|---|---|
| WO | WO 96/06222 | 2/1996 |

* cited by examiner

*Primary Examiner*—Mark Halpern
(74) *Attorney, Agent, or Firm*—Fellers, Snider, Blankenship, Bailey & Tippens, P.C.; Scott R. Zingerman

(57) ABSTRACT

A composite web and process for manufacture from post-industrial scrap wherein the fibers are pre-opened and cut to an average fiber length of about 4 mm. A scrap fiber component and a cellulosic component of such fibers are blended into a fiber furnish. The scrap fiber component includes at least 15% synthetic fibers and may include a blend of natural fibers, high melting point synthetic fibers, and low melting point synthetic fibers. The cellulosic component may include post-industrial cotton fibers which may be refined before blending with the scrap fiber component. The fiber furnish is processed into an intermediate web such as by a drylaid or a wetlaid nonwoven process. The intermediate web is saturated with a latex binding agent and pressed and/or dried to form a composite web capable of further processing into molded or formed consumer or industrial products. The process is capable of producing a high basis weight composite web.

30 Claims, 3 Drawing Sheets

COMPOSITE WEB AND PROCESS FOR MANUFACTURE FROM POST-INDUSTRIAL SCRAP

CROSS REFERENCE TO RELATED APPLICATION

This invention claims benefit of co-pending U.S. Provisional Application Ser. No. 60/648,143 filed Jan. 28, 2005.

FIELD OF THE INVENTION

The present invention relates to the manufacture of nonwoven fibrous webs and specifically, the manufacture of nonwoven fibrous webs from cut and opened post-industrial scrap.

BACKGROUND OF THE INVENTION

As a result of the industrial manufacture of textile products such as apparel, carpet, furniture, and household goods, an enormous amount of cloth scrap, clippings, imperfect (rejected) waste or scrap material is produced. It is estimated that only about half of this post-industrial (preconsumer) scrap produced annually is recycled into usable by-products mainly for padding, stuffing, and insulating applications for the automotive, furniture, mattress, coarse yarn, home furnishings, paper, and other industries. Due to the limited demand for this material for these uses, it is estimated that in excess of 50,000 tons of post-industrial scrap is either burned or deposited in landfills annually. In light of the volume of waste produced and its heavy burden on landfills and waste streams, legislation has been enacted to require the producers of such post-industrial scrap to maintain responsibility over it, even after disposal, and be responsible for the effects caused by the disposal of such scrap. A need, therefore, exists for the development of consumer and/or industrial products which employ fibers reclaimed from such post-industrial scrap materials. In addition, a need exists for the ability to produce products from reclaimed post-industrial fibers which can be traced back to their source of manufacture.

Conventional methods of recycling post-industrial scraps are well known and include processes which tear and open the scrap to obtain distinct fibers and/or distinct bundles of fibers. However, the processes which tear and open these fibers can tear, fuse, and stretch (damage) the integrity of the fibers thereby reducing their value in the production of woven textiles. Such opened, reclaimed fibers are typically nonuniform in length and thickness, as well as have jagged or fused ends. Moreover, the length of the resulting fibers is often too short or too weak to be efficiently spun into yam or fabrics.

Methods are known in the industry for mixing virgin fiber with reclaimed fiber to produce yarn or fabrics. However, the use of virgin fiber increases the cost of production and decreases the consumption of the reclaimed fibers. In addition, the presence of reclaimed fibers obtained from conventional opening and cutting processes produces what has been considered low quality yam and fabric. It is thus evident that conventional methods of using post-industrial scrap fibers to produce industrial or consumer products were driven more by the desire to recycle these materials than their benefits imparted to the end product.

In addition, problems of fiber characteristics are encountered as a result of fibers which have been opened and cut from post-industrial scrap. Recycling of such post-industrial scrap is further complicated by the fact that such scrap commonly includes blends of synthetic, natural, and/or cellulosic fibers. The presence of different fiber types further complicates the ability to recycle post-industrial scrap into a uniform yarn or fabric.

When the post-industrial scrap consists of cotton, problems exist with regard to the ability to adequately open the fibers. This is due to the tightly woven nature of cotton fabric.

Historically, cotton fibers were the preferred binder in the manufacture of paper. Cotton fibers produce high quality paper; however, there is a high demand for cotton in textile manufacturing which makes it expensive for paper manufacture. As a result, refine wood pulp replaced cotton in the manufacture of paper due to its relatively inexpensive cost and abundant supply. A need, therefore, exists for a process which utilizes the abundant supply of post-industrial cotton scrap in a nonwoven process utilizing conventional paper making equipment.

As a result, the bulk of reclaimed post-industrial fibers have historically been used for padding, stuffing, and insulating applications (downcycle products). A need exists for a product which benefits from the properties provided by the presence blends of synthetic and natural fibers that can be controlled in the manufacturing process. A need also exists for a process which is capable of employing fibers which are nonuniform in length, thickness, and end structure.

Nonwoven products are produced commercially from webs of individual fibers or bundles of fibers. Conventional processes for the production of nonwoven products include drylaid (carding and airlaid) and wetlaid. Nonwoven manufacturing techniques are capable of processing natural, cellulosic, and synthetic fibers into a web. In a conventional airlaid process, fibers are provided to an air stream and carried to a condensed screen where they are captured to form a web. The web is delivered to a conveyor and transported to a binding area where a binder is applied.

Wetlaid nonwoven webs are manufactured by a modified paper making process on a conventional paper making machine. A known problem is associated with wetlaid nonwovens using synthetic fibers. Synthetic fibers are known to floc prior to being deposited on the wire thereby producing visual and textural defects in the nonwoven web. In addition, fiber uniformity and clean cut end structure derived from virgin extruded staple (textile) length consisting of smooth rods of solid polymer exterior surface have been conventionally considered critical to uniform nonwoven web formation. In addition, traditional paper making equipment was designed to process nonwoven webs with a basis weight in the 80 lb.-150 lb./3000 ft.$^2$ range (130-244 g/m$^2$).

A need, therefore, exists for a process which is capable of using opened and cut post-industrial fibers which include a component of synthetic fibers in the manufacture of a nonwoven composite product. A flurther need exists to produce a high basis weight nonwoven web from fibers of nonuniform length, diameter, and end structure.

SUMMARY OF THE INVENTION

A composite web and process for manufacture from post-industrial scrap wherein the scrap fibers are cut, opened, and refined. In the present process, a blend of the fibers including a scrap fiber component and a cellulosic component is processed into an intermediate web using a conventional nonwoven manufacturing process (such as by an airlaid or wetlaid nonwoven web forming process). The intermediate web is saturated with a binding agent and dried to form a composite web. The composite web formed by the present process is suitable for further processing into molded or formed consumer or industrial products.

In addition, if the source of the fibers is known, it is possible to track these fibers through the present process to the composite board and products formed therefrom. As a result, it is possible to trace the fibers in the end product back to their source.

The fibers which are produced from processes for opening and cutting post-industrial scrap, which are the raw materials for the present process, are short average length fibers and vary greatly in length and diameter. In addition, such reclaimed post-industrial fibers have coarse exterior surfaces and jagged ends. Such processed and reclaimed synthetic fibers often include a percentage of fibers with melted or partially melted and/or fused ends. As a result, fibers which are reclaimed from post-industrial waste through opening and cutting are nonuniform in length, diameter, and end structure. The process of the present invention is particularly suitable for the production of a composite web from such nonuniform raw materials which can be further processed into useful articles of manufacture.

In the process of the present invention, the term scrap fiber component is defined to include at least 15% low melting point synthetic fibers such as polyethylene or polypropylene. However, the scrap fiber component may include a blend a synthetic fibers and/or may include a blend of low melting point synthetic fibers and high melting point synthetic fibers such as nylon or polyester. Depending upon the type and source of the post-industrial scrap from which the scrap fiber component is derived, a percentage of natural fibers (such as sisal, hemp, or cotton) may also be present in the scrap fiber component.

The cellulosic component of the present process is defined herein to include natural fibers such as cotton and preferably, cotton derived from post-industrial scrap and may include a percentage of wood pulp. The cellulosic component helps to hold the intermediate web together during processing. Due to the large amount of cotton used in industrial processing of textiles, a significant amount of post-industrial cotton is available in the waste stream. Opened, cut, and refined cellulosic cotton fiber acts well to bind the fibers in the intermediate web. The cotton fiber may require refining prior to blending with the scrap fiber component.

The intermediate web is then saturated with a binding agent in order to supply wet and dry strength to the composite web. The binding agent also acts to provide an adhesive bond between the synthetic and cellulosic component fibers in the web and may also be selected to provide structural, and/or other characteristics, such as water resistance, to the composite and resulting products manufactured therefrom. The intermediate web is then pressed a second time to remove excess water. One way to add the binder is to use the process of wet saturation. In this process, the fiber web is formed on a fourdrinier paper machine and wet pressed to about 50% solids. The wet web is then saturated with the aqueous binder. Finally, it is dried by passing over a series of steam heated dryer drums. The process results in a composite web which is highly suitable for further processing into molded articles of manufacture and/or formed into a structural member.

As a result, it is an object of the present invention to provide a process for converting post-industrial textile scrap material into a usable commercial product and specifically, to convert post-industrial scrap into a composite web which can be molded into an article of manufacture or formed into a structural member.

It is a further object of the present invention to process opened and cut post-industrial scrap fibers which are nonuniform in length, thickness, and end structure.

An additional object of the present invention is to provide a process which is capable of recovering suitable fibers or bundles of fibers from post-industrial scrap which include a blend of a scrap fiber component and a cellulosic component.

A yet further object of the present invention is to provide a process which is capable of recovering suitable fibers or bundles of fibers from post-industrial scrap which include a blend of a scrap fiber component and a cellulosic component with a binding agent.

Another object of the present invention is to provide a process to manufacture a high basis weight nonwoven composite web from post-industrial scrap fibers.

A yet further object of the present invention is to produce composite web from post-industrial scrap fibers which can be traced back to their origin.

A better understanding of the present invention, its several aspects, and its advantages will become apparent to those skilled in the art from the following detailed description, wherein there is described the preferred embodiment of the invention, simply by way of illustration of the best mode contemplated for carrying out the invention.

DETAIL DESCRIPTION OF THE PREFERRED EMBODIMENT

The present invention relates to the manufacture of a composite web from fibers recovered from post-industrial scrap. The scrap is comprised of waste or other such preconsumer textile products produced from the apparel, carpet, furniture, and household goods industries. Processes are available and known in the industry for cutting and opening the scrap raw material to produce component fibers.

Figure 1:
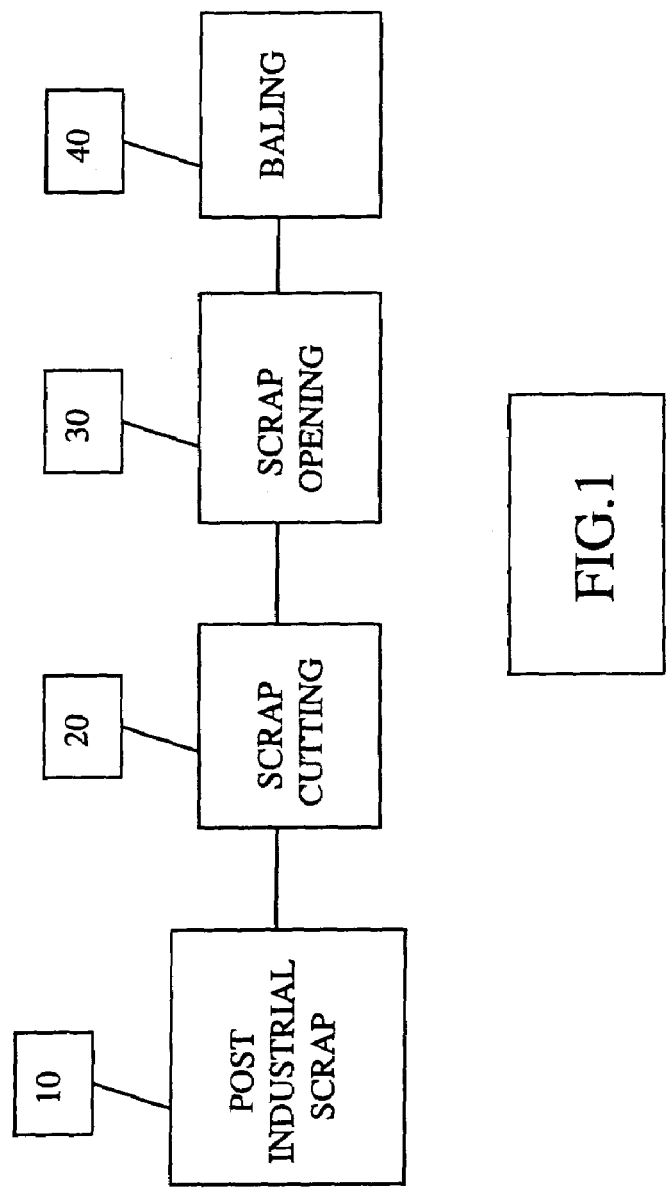
FIG. 1 depicts a flowchart of a process for opening and cutting post-industrial scrap fibers.

A conventional process for cutting and opening such fibers is the depicted in FIG. 1. FIG. 1 depicts scrap 10 obtained from the post-industrial waste stream. Since scrap 10 is typically obtained from the producer/manufacturer, the component fibers of the textile scrap are known. The post-industrial scrap material may include synthetic, natural, and/or cellulosic fibers.

Post-industrial scrap 10 is first conveyed to scrap cutting station 20 where the scrap material is cut into small pieces. From there, the cut scrap is conveyed to an opening line where a series of rotary cutters or rotary pins successively pull apart the fabric until it is reduced to its constituent fibers.

From opening line 30, the opened fibers from the post-industrial scrap 10 are conveyed to a baling apparatus 40. Once cut and opened, the reclaimed post-industrial scrap fibers are baled for further processing.

The fibers which result from a conventional opening process are commonly stretched, twisted, and distorted which may result in weakening of the fibers. In addition, although an attempt is made to produce uniform fiber lengths, such attempts are relative and are generally within a range with an attempted average fiber length. Conventional cutting and opening processes also produce fibers which are frayed and include an end structure which is not cleanly cut resulting in pulled or trailing ends. With regard to synthetic fibers, as the cutting blades heat up as a result of friction and begin to become dull, the synthetic fiber ends tend to melt and/or fuse with adjacent fibers. All of these nonuniformities (damage) cause difficulty in processing the reclaimed fibers into nonwoven webs. Moreover, conventional opening processes have been found unsuitable for opening tightly woven fabrics such as cotton textiles.

A proprietary process for opening and cutting fibers from post-industrial scrap has been developed by Sustainable Solutions, Inc., Tulsa, Okla. By way of this process, opened and cut fibers can be obtained which are traceable to the originator of the post-industrial scrap as may be or become necessary as a result of legislation. When such traceable fibers are obtained, they are highly suited for use in the present process so that they can be traced through to the resultant composite web and thereon for further processing. In this way, the reclaimed fibers in the recycling stream are traceable to their origins.

If traceable fibers are obtained, those fibers can be tracked through the present process to the resultant composite web and products made therefrom. In this way, these fibers can be traced back to their source.

Figure 2:
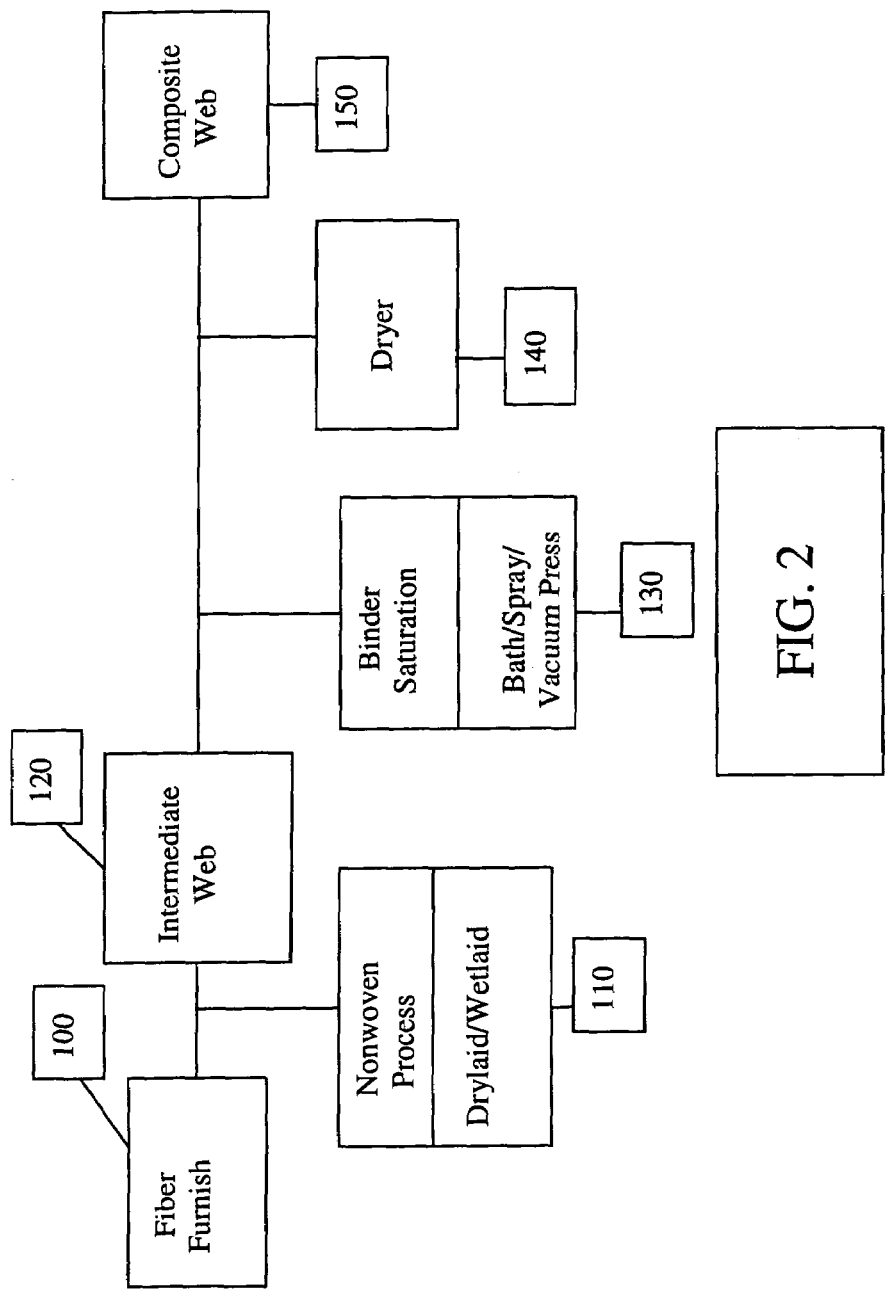
FIG. 2 depicts a flowchart of the process for producing a composite web from post-industrial scrap according to the present invention.

In the present process, opened and cut fibers from post-industrial scrap are obtained. The opened and cut fibers, and particularly, the cellulosic component fibers are refined and mixed to form a fiber furnish 100 (FIG. 2).

In order to facilitate proper bonding between the component fibers, and particularly the natural component fibers, it is advantageous to refine the fiber furnish prior to formation of intermediate web 120. With regard to the present invention, the term refining shall mean to perform a freeness reduction on the natural fibers and cellulosic fibers in the fiber furnish.

The refining process preferably includes a conventional technique for hydrating the cellulosic and natural fibers using a disk refiner equipped with bars in a water solution, however, other refining methods are contemplated in this process. Although hydration in the chemical sense does not occur, the affinity for water of the fiber matrix is enhanced. Refining the fiber causes the natural fibers, and particularly the cellulosic component fibers to swell (take on water), bend, and fibrillate. The swelling and fibrillation enhances the number of interfiber contacts during formation of the intermediate web. The outer surfaces of the fibers become more slippery such that the tendency to form fiber flocs (bundles of fiber) is reduced. The refined fibers form hydrogen bonds which join them upon drying. Refining greatly increases the wet specific surface of the natural fibers, the swollen specific volume, and the fiber flexibility. The result is a fiber furnish that includes natural fibers and cellulosic fibers which are tangled and suitably prepared for formation of intermediate web 120. Refining also significantly increases the quality of the fibers to bond when dried from the fiber furnish to form intermediate web 120. A freeness reduction (Canadian standard) of the natural fibers from approximately 700° CSF down to approximately 200° CSF is preferred in the present process.

In a second preferred embodiment, the cellulosic component fibers are refined before being mixed with the scrap fiber component in the fiber furnish. Once the fiber furnish is prepared by adding the scrap fiber component, it is further refined to facilitate bonding of the fibers, particularly where the scrap fiber component includes a percentage of natural fibers.

With reference to FIG. 2, a flowchart of the process of the present invention, the opened, cut, and refined fibers 100 are mixed to form a fiber furnish. The fiber furnish includes a scrap fiber component and a natural component.

As stated above, the term scrap fiber component includes at least 15% of low melting point (below approximately 175° C.) synthetic fiber and preferably between about 15% and 25%. By way of example, and not limitation, such low melting point synthetic fibers can be olefin, such as polyethylene, polypropylene, or polyesters which have a low melt temperature. Other examples of low melting point synthetic fibers are bicomponent fibers which are spun from intimately mixed blends of polymers. Examples of such bicomponent fibers are as follows:

Polyethylenes:
Low density PE (0.90-0.940 g/cc)
Long-chain branched PE
LLDPE (made with $C_3$-$C_{10}$ alpha-1-olefin copolymers or 4-methyl-1-pentene) Medium and high density PE (0.940-0.960 g/cc)
Homopolymer or with copolymers described above
Atactic polypropylene
Polypropylene
Block copolymers of ethylene and propylene
Random copolymers of ethylene and propylene
Polybutylene It should be understood that this list is not exhaustive and not limiting with regard to fibers that could be considered low melting point fibers for the purpose of the present invention.

The low melting point synthetic fibers described herein can be activated (melted) in the drying step 140 or during a later hot calendaring or heat pressing step. If the low melting point synthetic fibers are activated in drying step 140, an efficient process for formation of a composite web is defined. In addition to low melting point synthetic fibers, the scrap fiber component may include high melting point synthetic fibers. Examples of such high melting point synthetic fibers (MP above about 175° C.) are commonly found in opened post-industrial scrap commonly include nylon and polyester fibers. Other examples include the following:

Polystyrene
Styrene copolymers, e.g. styrene acrylonitrile [SAN]
Polyphenylene ether
Polyphenylene Oxide [PPO]
Polyetheretherketone [PEEK]
Polyetherimide
Polyphenylene Sulfide [PPS]
Poly(vinyl acetate) [PVA]
Poly(methyl methacrylate) [PMMA]
Poly(methacrylate) [PMA]
Ethylene acrylic acid copolymer
Polysulfone It should be understood that this list is not exhaustive and not limiting with regard to fibers that could be considered high melting point synthetic fibers for the purpose of the present invention.

It is contemplated that the scrap fiber component in the present process may include between approximately 25% and 35% by weight high melting point synthetic fibers. Due to the high molecular weigh of the molecules which form these fibers, high melting point synthetic fibers impart strength to the resulting composite web.

It is also contemplated that the scrap fiber component may include natural fibers derived from the opened post-industrial scrap. Nonexhaustive examples of such natural fibers may be cotton, wool, jute, kenaf, hemp, and/or other cellulose staple fibers. It is understood that the process is not limited to these specific examples, however, and included are fibers that are mechanically generated from organic materials such as leather. The percentage of natural fibers which might be present in the scrap fiber component may be between approximately 45% and 55% by weight.

It has been found that a suitable fiber blend comprising the scrap fiber component for the formation of a composite web is as follows:

approximately 50% by weight natural fibers;
approximately 30% by weight nonfusible synthetic fibers;
approximately 20% by weight low-melt synthetic fibers.

The natural component of the present process is cut and opened cotton fibers derived from post-industrial scrap cotton textiles.

Cotton is conventionally designed to be tightly woven to produce a tough and durable fabric. As a result, cotton textile fabrics are difficult to open. However, due to their abundance, opened fibers derived from post-industrial cotton scrap is highly suited for the natural component of the process of the present invention.

In the present process, a fiber furnish including opened and cut fibers with a scrap fiber component and an organic component 100 (FIG. 2) is process using a known nonwoven manufacturing process 110 to produce an intermediate web 120.

Since nonwoven fabrics are prepared from a fibrous web, the characteristics of the web significantly affect the physical properties of the final nonwoven product. These characteristics are derived from the web geometry, which is typically a function of the process by which the web is formed. Web geometry includes characteristics such as the orientation of the fibers, whether the fibers are oriented in a predominate direction or whether their orientation is random, the shape of the fiber (straight, hooked or curled), the extent of fiber entanglement, and fiber compaction. The characteristics of the nonwoven web are also a function of the fiber length (and uniformity), diameter uniformity and web weight.

The decision as to which process is employed for web formation was conventionally determined by the length of the fiber. Historically, the methods for forming of nonwoven webs from virgin uniform textile length fibers was performed using a drylaid (carding) process or by an airlaid process, while nonwoven web formation using short uniform length fibers performed using a wetlaid process on paper making equipment.

Using the process of the present invention, it is contemplated a composite nonwoven web can be prepared by any known nonwoven process such as airlaid or wetlaid processes. However, due to the abundant availability of paper making machinery, particularly in the United States, formation of intermediate web 120 using a wetlaid process on a conventional paper making machine is the preferred process. It should be understood, however, that intermediate web 120 could be formed using a drylaid and particularly airlaid process.

In the preferred embodiment, after the fibers are refined and the fiber furnish formed, the refined fibers are transported to the headbox of a conventional paper making machine such as a conventional fourdrinier machine where they are fed continuously onto the wire thus forming the intermediate web.

Typically, nonwoven webs produced on a conventional paper making machine range in basis weight from 20 lb.-150 lb./3000 ft.$^2$ (approx. 32-244 g/m$^2$). The composite web which is produced by the present process far exceeds this range. Basis weight composite webs in excess of 400 lb., and commonly in the 600 lb.-900 lb./3000 ft.$^2$ (approx. 975-1500 g/m$^2$) range, are contemplated using the present process.

In general, synthetic fibers are stronger, more uniform, more flexible, and less compatible with water than natural fibers. Due to their flexibility and strength, synthetic fibers frequently entangle (flocculate) when they are dispersed in water. Due to their propensity to cause flocculation, synthetic fibers have limited their use in nonwoven webs, particularly when processed with wetlaid processes on conventional paper making equipment.

The conventional strategy for reducing flocculation of fiber due to the presence of synthetic fibers is to increase the dilution by adding additional water to the fiber furnish. While the addition of lots of water operates to physically separate the synthetic fibers in the fiber furnish, the volume of water required necessitates specialized equipment. The circulation of this volume of water also significantly increases the expense of production of the nonwoven web. In addition, the volume of water must be drained through the wire of the paper making machine without interrupting the formation of the web.

An alternative, preferred, solution to an increase in the volume of water in the fiber furnish is the addition of a polymeric surfactant. Polymeric surfactants attach to the surfaces of fibers at their interface with water when the fibers are suspended in water.

On a molecular level, polymeric surfactant molecules include multiples of both a hydrophilic segment and a hydrophobic segment. Since synthetic fibers are hydrophobic by nature, the hydrophobic segment of the molecules bonds with the synthetic fiber while the hydrophilic segment of the molecule bonds with the surrounding water. The result is that an area of higher viscosity is created around the surface of the synthetic fiber with only a slight increase in the viscosity of the suspension water. Thus, passage of water through the wire in a wetlaid web formation is not significantly affected. The areas of higher viscosity created around the synthetic fibers act as a lubricant which allows adjacent fibers to slide past each other in suspension in the fiber furnish without entanglement. As a result, flocculation of the synthetic fibers is greatly reduced, if not eliminated.

A polymeric surfactant that is suitable for this purpose includes relatively low (10,000 to 200,000) molecular weight ethylene oxide based urethane block copolymers. Commercial formulations of these polymeric surfactants are available commercially from Rohm and Haas under the trademarks Acrysol RM-825, Acrysol RM-8W, and Acrysol Rheology Modifier QR-108, QR-375 and QR-1001.

In the process of the present invention, the polymeric surfactant is preferably added to the water suspension prior to introduction of the scrap fiber component, most preferably before the scrap fiber component fibers are blended with the natural component fibers to form the furnish to be delivered to the wire of a conventional paper making machine. By a combination of draining and/or pressing, water is removed from the intermediate web until it is comprised of approximately 50% by weight water and 50% by weight fiber solids. The intermediate web is then conveyed to a binder station 130 where the composite web is saturated with a binding agent.

The binding agent used in the present process will comprise approximately 25%-30% of the composite web, when dried. Therefore, the properties of the binding agent are selected and directly affect the characteristics of the composite web.

Binding agents used in the formation of the composite web in the present invention are preferably of the type which are capable of binding the scrap fiber component and natural component fibers to one another. Most preferably these binding agents comprise organic polymer materials which may be heat fused or heat cured at elevated temperatures to bind (bond) the fibers and to provide desired characteristics, such as hydrophobicity, moldability, or stability to consumer and/or industrial products formed from the composite web.

Suitable binding agents include polymeric materials in the form of water dispersed emulsions or solutions and solvent based solutions. These polymer emulsions are typically referred to as "latexes." With regard to the present invention, the term "latex" refers very broadly to any aqueous emulsion of a polymeric material.

Commercially available latexes have been optimized to promote adhesion to hydrophobic synthetic fibers which may be available in the scrap fiber component of the present process. The range of chemical modifications to latexes which are commercially available is large and designed to meet almost any desired characteristic of the composite web or end use requirement of products manufactured therefrom.

Latex materials used as binding agents in accordance with the present process can range from hard rigid types to those which are soft and pliable (rubbery). Moreover, these latexes may be either thermoplastic or thermosetting in nature. In the case of thermoplastic latex, the latex may or may not be a material which remains permanently thermoplastic. The latex binding agents used in the present process may include non-crosslinked latex, which is preferred. Alternatively, such binding agents may be of a type which is partially or fully cross-linkable, with or without an external catalyst, into a thermosetting type binder. Listed below are several examples of suitable binding agents for use with the present process. It should be understood that the present invention is not limited to the specific examples listed in the categories defined below as other suitable binding agents are contemplated depending upon the desired characteristics in the composite web. Suitable thermoplastic latex binders can be made of the following materials:
  vinyl alcohol
  ethylene vinyl alcohol
  polyvinyl acetate
  polyvinyl alcohol
  acrylic
  polyvinyl acetate acrylate
  acrylates
  polyvinyl dichloride
  vinyl acetate
  ethylene vinyl acetate
  ethylene vinyl chloride
  polyvinyl chloride
  neoprene
  styrene
  styrene acrylate
  styrene/butadiene
  styrene/acrylonitrile
  butadiene
  butadiene/acrylonitrile
  acrylonitrile/butadiene/styrene
  ethylene acrylic acid
  polyethylene urethanes
  polycarbonate
  polyphenylene oxide
  polypropylene
  polyesters
  polyamides Carboxylation or the addition of the reactive groups to enhance the physical and chemical properties may fluctionally alter and improve certain of these latex systems. Others may be improved by compounding with chemical modifiers. Typical materials added to latexes are:
  thickeners and protective colloids;
  surfactants to improve stability, wetting and penetration;
  water-miscible organic liquids added as temporary plasticizers, defoaming agents, or humectants;
  water soluble salts, acids, and bases added to adjust pH, alter flow properties, and stabilize the latex polymer against heat and light breakdown.

In addition, a few specific examples of thermoset binding agents include those made of the following materials:
  epoxy
  phenolic
  bismaleimide
  polyimide
  melamine
  melamine/formaldehyde
  polyester
  urethanes
  urea
  urea/formaldehyde It is contemplated that the binding agent can be added to the intermediate web 120 (FIG. 2) by the process of wet saturation or the process of dry saturation. In the wet saturation process, the intermediate web 120 is pressed to about 50% solids and then the saturation fluid containing the binder is added to the web. As the web passes through the wet saturation section, it imbibes the fluid. Finally, the web passes through a second press which removes water and a portion of the binder. The web then enters a dryer section where the remaining water is removed.

An alternative method of introducing the binding agent to the intermediate web is the dry saturation process. In this process, the formed web is pressed to about 50% solids and then it enters a dryer section where the remaining water is removed. The dry web is then wetted with a fluid containing the binding agent. The fluid can be added by roll coating, bath, dip and squeeze, sprayer, or curtain application methods. For certain binder compositions, it may be advantageous to convert the fluid containing the binding agent into a foam. After a period of time to allow for penetration, the web passes into a dryer section where water is removed.

In the preferred embodiment of the present process which is wet saturation, the binding agent displaces the water in the intermediate web. In this way, the intermediate web becomes saturated with binding agent.

In the present process, materials may be added to the binding agent to produce a desired characteristic in the composite web, and thereafter the consumer and/or industrial product formed therefrom. These materials could vary from pigments to provide color, odor adsorbents or materials to provide a fragrance, fire retardant materials and the like.

The composite web of the present invention may include pigments or colorants as desired. Pigments or colorants can broadly be defined as being capable of re-emitting light of certain wavelengths while absorbing light of other wavelengths and which are used to impart color. Fire retardant materials are those which reduce the flammability of the fibers in the composite web. Preferably these materials are active fire retardants in that they chemically inhibit oxidation or they emit water or other fire suppressing substances when burned.

Although not limited to specific materials, examples of suitable materials include pigments and whiteners, such as inorganic pigments including titanium dioxide, ferrous oxide, PbO, $Al_2O_3$ and $CaCO_3$ and organic pigments or colorants, ultraviolet, infrared or other wave length blocking or inhibiting particulates, such as carbon blacks as an ultraviolet inhibitor and zirconium carbide as an infrared inhibitor; fire retardant materials, such as alumina trihydrate, antimony oxide, chlorinated and brominated compounds, pentabromochlorocyclohexane, 1,2-Bis 2,4,6-tribromophenoxy ethane, decabromodiphenyl oxide, molybdenum oxide and ammonium fluoroborate, etc.; electrically conductive materials, such as metallic powders and carbon black; abrasive materials, such as ceramics, grit and metallic powders (with flint, garnet, sand, corundum, silicon carbide and stannous oxide, fly ash, stellite and silica being specific nonlimiting examples); acidular materials, such as clay, talc and mica, oleophilic materials such as fumed silica; hydrophobic materials; and hydrophilic materials, such as hydrophillic silica (e.g. silane treated foamed silica) and super absorbent particles; pesticides and insecticides, fertilizers; antimicrobial particulates, such as broad spectrum antimicrobials (e.g. hypochlorites, perborates, quaternary ammonium compounds, bisulfites, peroxides, etc.), antivirals, antimycotics, antibacterials, antirickettsials, antibiotics, biocides, biostats, etc., and mixtures thereof; molecular sieves, such as odor absorbing sieves (odor absorbing sieves, e.g. sodium alumino silicates), charcoal, drying agents (molecular sieves, magnesium sulfate, sodium sulfate, etc. and activated carbon); zeolites, e.g. based upon alumino phosphates and which may be modified to have antimicrobial properties; acids and bases, for example to alter the pH of a hazardous spill (ammonium chloride, aluminum sulfate, calcium carbonate, sodium bicarbonate, etc.; fiber appearance modifiers, such as mica, phosphorescent compounds (e.g. luciferin/luciferase, zinc sulfide/manganese); microspheres, including microencapsulated particles comprising time release microspheres which may contain a variety of chemicals, such as fertilizers and perfumes; microsponges, with or without added chemicals for functionality purposes; odor absorbing, inhibiting and masking particles such as activated carbon and perfumes (e.g. anisyl alcohol, benzophanone, musk and odor absorbing sieves mentioned above); fungicides (which may be broadly considered as an antimicrobial), such as misonazole nitrate trichloromethythio-dicarboximides, etc.; electromagnetic absorbers/deadeners (e.g. Fe, Pb, Al, Ag, Au).

As stated, it should be understood that the materials which may be added are not limited to narrow categories. Furthermore, one or more of the above may be added as required. When added, multiple types may be adhered to the same fibers in the composite web. Also, the specific examples listed in the categories identified above are by no means exhaustive nor are the categories intended to be limiting for the purpose of the present invention.

Once the intermediate web is saturated with binder 130, it may be further pressed to remove excess binding agent. Pressing the web is preferred because it is comparatively less expensive to remove any remaining water and excess binding agent mechanically than thermally. In the present process, a press temperature in the range of 330-350° F. is contemplated.

The intermediate web saturated with binding agent is then conveyed to a dryer 140. Water is removed from the intermediate web by evaporation, thus leaving the binder behind. It is contemplated that any known convection, contact, or radiation dryer would be suitable for this purpose. In the preferred embodiment, conventional steam heated drum dryers are employed due to their availability commercially.

Once dried, a composite web 150 is obtained as a result of the present process. The composite web 150 is particularly suitable for further processing into moldable, or pressed consumer or industrial products. The fact that composite web 150 includes a scrap fiber component imparts the benefit of moldability. In addition, once the low melting point component is activated, other properties are derived such as water resistance to the final product. High melting point fibers are present in the composite web 150 to improve the structural qualities. As a result, the inherent qualities of the post-industrial scrap fibers are maximized to impart desirable characteristics to composite web 150.

A preferred composite web 150 produced by the process of the present invention will include the following composition:
- between about 45% and 55% and preferably about 50% by weight scrap fiber component;
- between about 20% and 30% and preferably about 25% by weight cellulosic component;
- between about 20% and 30% and preferably about 25% by weight binding agent.

Figure 3:
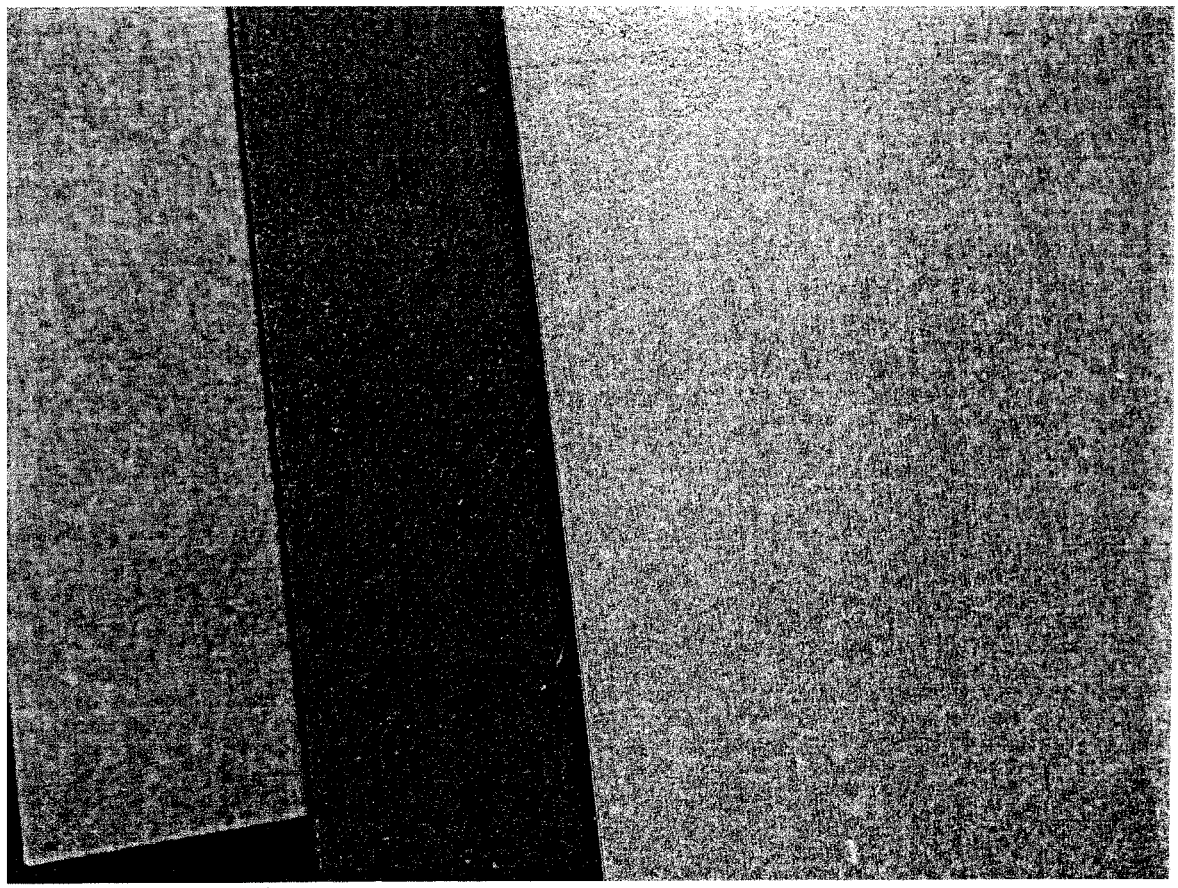
FIG. 3 depicts a photograph of the composite web formed by the process of the present invention and the fibers therein.

FIG. 3 is a photograph of a composite web produced from the present process. Component fibers are visible in the composite web of FIG. 3.

EXAMPLE 1

A composite web was formed by the process of the present invention by obtaining cut and opened scrap fiber component and cellulosic component fibers. The scrap fiber component included a blend of 50% natural fibers, 30% high melting point synthetic fibers, and 20% low melting point synthetic fibers. The cellulosic component included cut and opened cotton fibers and was refined using a disk refiner equipped with bars in a water solution to approximately 300° CSF. After the cellulosic component was refined, the scrap fiber component was added to form a fiber furnish. The fiber furnish was refined to approximately 600° CSF. A 2% polyvinyl alcohol solution was added to the fiber furnish to assist dispersion and a 2% surfactant solution was also added. The fiber furnish was delivered to the wire of a fourdrinier machine where a basis weight intermediate web of approximately 900 lb./3000 ft.$^2$ was formed. The intermediate web was then pressed in a wet calendar nip to approximately 50% solids. A 30-35% latex solution was sprinkled on top of the intermediate web with a contact time of approximately 20 seconds to saturate the intermediate web. The saturated intermediate web was then pressed in a wet calendar nip to remove additional water to approximately 50% solids. The intermediate web was then dried over steam heated drums to form a composite web. Table I includes the characteristics of the composite web.

TABLE I

| Caliper | 3.25 mm | |
|---|---|---|
| Density | 0.45 g/cm$^3$ | |
| Basis Weight | 900 lb./3000 ft.$^2$ | (TAPPI 410) |
| Taber Flex Stiffness | 4350 MD | (TAPPI 498 OM92) |
| Dry Tensile | 240 lb./inch. MD | SATRA pm 6 |
| | 130 lb./inch. CD | |
| Wet Tensile | 200 lb./inc. MD | SATRA pm2 |
| | 100 lb./inch. CD | |
| Z-Direction Tensile | 200 lb./inch. DRY | SATRA pm8 |
| | 140 lb./inch. WET | |

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A process for manufacture of a composite web from post-industrial scrap wherein the scrap fibers are cut, opened, and refined, comprising:

obtaining a furnish of the scrap fibers including a scrap fiber component and a cellulosic component;

processing said fiber furnish to form an intermediate web;

once formed, saturating said intermediate web with a binding agent to form a composite web;

drying said composite web.

2. The process of claim 1 wherein said scrap fiber component includes between about 15% and 30% by weight low melting point synthetic fiber.

3. The process of claim 2 wherein said low melting point synthetic fiber is selected from a group consisting of polypropylene, low-melt polyester and latex chrome.

4. The process of claim 1 wherein said scrap fiber component includes at least 25% high melting point synthetic fiber.

5. The process of claim 4 wherein said high melting point synthetic fiber is selected from a group consisting of nylon, polyester, cellulose acetate, and acrylic.

6. The process of claim 1 wherein said scrap fiber component includes natural fibers.

7. The process of claim 6 wherein said scrap fiber component includes at least 45% by weight natural fibers.

8. The process of claim 6 wherein said natural fibers are selected from a group consisting of cotton, jute, kenaf, linen, and wool.

9. The process of claim 1 wherein said scrap fiber component is a blend of natural fibers, high melting point synthetic fibers, and low melting point synthetic fibers.

10. The process of claim 1 wherein said scrap fiber component is a fiber blend comprising:

between about 45% and 55% by weight natural fibers;

between about 25% and 35% by weight high melting point synthetic fibers;

between about 15% and 25% by weight low melting point synthetic fiber.

11. The process of claim 1 wherein said scrap fiber component is a fiber blend, comprising:

approximately 50% by weight natural fibers;

approximately 30% by weight high melting point synthetic fibers;

approximately 20% by weight low melting point synthetic fiber.

12. A composite web formed from the process of claim 11.

13. The composite web of claim 12 wherein said composite web comprises:

approximately 50% by weight scrap fiber component;

approximately 25% by weight cellulosic component;

approximately 25% by weight binding agent.

14. The process of claim 12 wherein said composite web has a basis weight greater than 200 lbs./3000 ft.$^2$.

15. The process of claim 1 wherein said fibers in said fiber furnish range in length from 1 mm to 10 mm and a diameter of 0.5 denier to 4 denier.

16. The process of claim 1 wherein said fibers in said fiber furnish have an average fiber length of 4 mm.

17. The process of claim 1 where in said cellulosic component is cotton.

18. The process of claim 1 wherein said fiber furnish is further refined prior to processing to form said intermediate web.

19. The process of claim 1 wherein an airlaid process is employed to form said intermediate web from said fiber furnish.

20. The process of claim 1 wherein a wetlaid process is employed to form said intermediate web from said fiber furnish.

21. The process of claim 1 wherein the cellulosic component is refined prior to mixing with said scrap fiber component.

22. The process of claim 21 wherein a polymeric surfactant is added to the fiber furnish prior to processing.

23. The process of claim 22 wherein said polymeric surfactant is a low molecular weight ethylene oxide based urethane block copolymer.

24. The process of claim 1 wherein the composite web is heat pressed after drying.

25. The process of claim 1 wherein pigment material is added to said binding agent.

26. The process of claim 1 wherein an odor absorbing material is added to said binding agent.

27. The process of claim 1 Wherein fragrance producing material is added to said binding agent.

28. A process for manufacture of a composite web from post-industrial scrap wherein the scrap fibers are cut, opened, and refined, comprising:

obtaining a furnish of the scrap fibers including a scrap fiber component and a cellulosic component;

processing said fiber furnish to form an intermediate web;

saturating said intermediate web with a binding agent to provide and adhesive bond between said scrap fiber component and said cellulosic component to form a composite web;

drying said composite web.

29. The process of claim 28 wherein said binding agent further imparts wet/dry strength to said composite web.

30. the process of claim 28 wherein said binding agent further imparts desired physical characteristics to said composite web.

* * * * *